Dec. 11, 1956 — E. S. GANDRUD — 2,773,626
SPREADER FOR FERTILIZER, SEEDS AND THE LIKE
AND FEED RATE CONTROL THEREFOR

Filed March 2, 1955

INVENTOR.
Ebenhard S. Gandrud
BY
Merchant & Merchant
ATTORNEYS

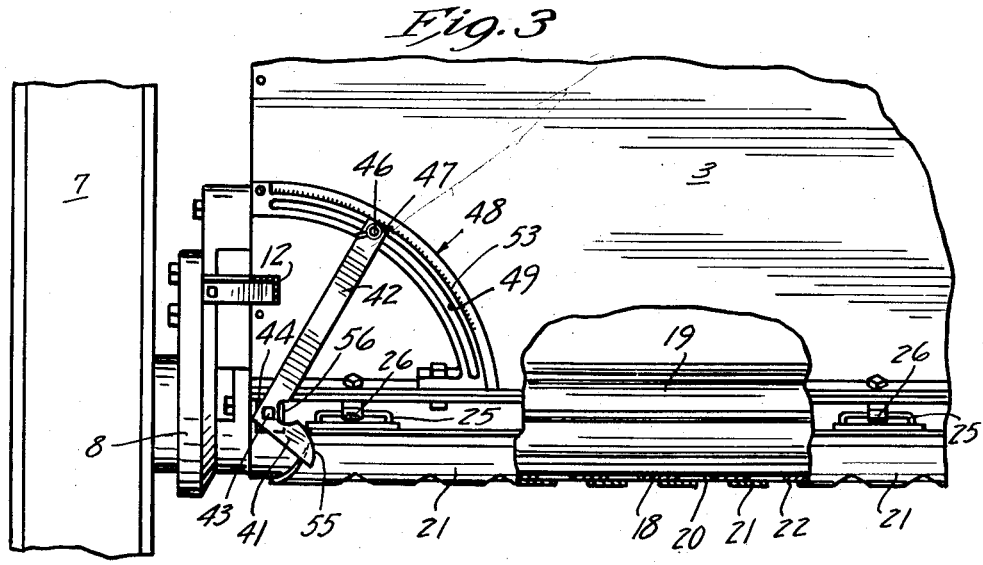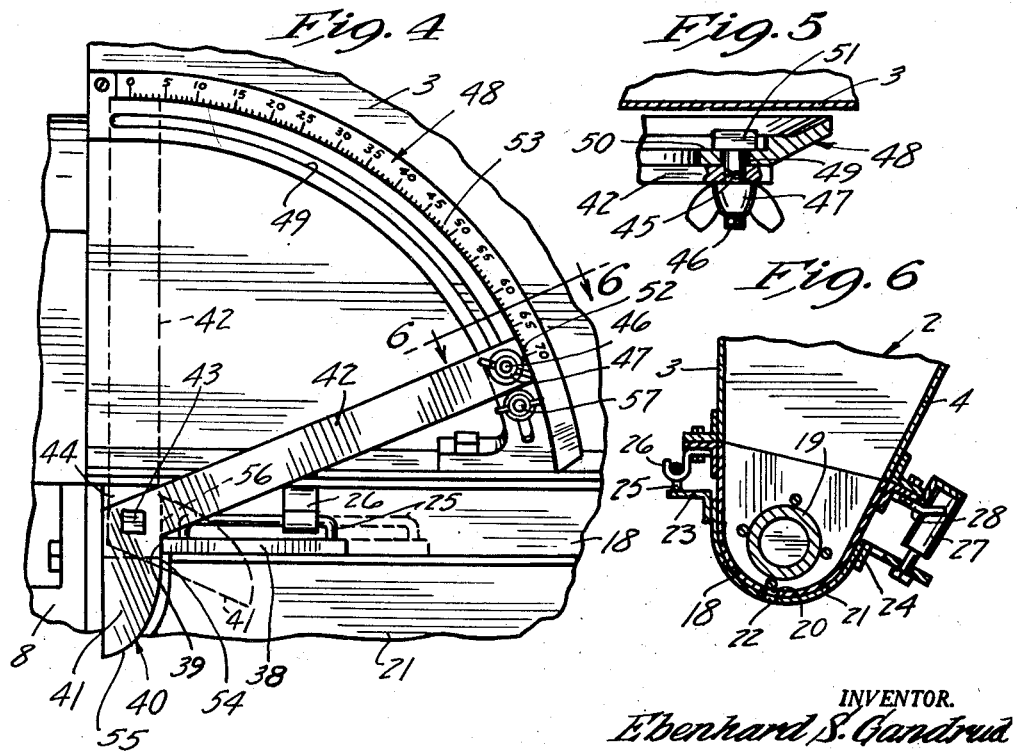

United States Patent Office 2,773,626
Patented Dec. 11, 1956

2,773,626

SPREADER FOR FERTILIZER, SEEDS AND THE LIKE AND FEED RATE CONTROL THEREFOR

Ebenhard S. Gandrud, Owatonna, Minn.

Application March 2, 1955, Serial No. 491,641

7 Claims. (Cl. 222—43)

My present invention relates generally to improvements in machines for spreading fertilizer, seeds or the like, and more particularly to novel means for controlling the rate of feed of material from such machines.

Fertilizer spreaders and analogous machines generally utilize a wheel mounted hopper having one or more discharge apertures and valve means controlling the flow or feed of material from the hopper to the ground. Inasmuch as soil conditions vary as to plant food requirements, the rate of feed of a machine of the above type must be carefully controlled to avoid either insufficient soil treatment, or waste or injury due to overfeeding.

Several machines of the above type are at present available, which use various types of indicators or control mechanisms whereby the rate of material flow is governed. Some of these machines have rate control mechanisms which are manipulated by the operator on a tractor or analogous vehicle used to pull the machine over the field. Those indicators or control devices which are interposed in the linkage between the operating handle or lever adjacent the operator's station and the machine, are affected by a certain amount of lost motion prevalent in operating linkages. For this reason, accurate control of the rate of feed is difficult to maintain, particularly when the feed control valve is closed and reopened several times during the passage of the machine over the field.

An important object of my invention is the provision of a feed rate control and indicator which meters the flow of material to an extremely accurate degree, and which, when the feed valve is closed and thereafter reopened, will cause the material to be fed at exactly the same rate as previously. To this end, I provide a stop element on one end of the valve means and a cooperating abutment element on one end of a control arm pivotally mounted adjacent one end of the hopper, said abutment element having an operating face engageable by the stop element upon movements of the valve means in one direction, to adjustably limit movement of the valve means in said one direction.

Another object of my invention is the provision of a feed rate control which may be quickly and easily adjusted to vary the rate of flow of material to the exact amount desired.

Another object of my invention is the provision of a feed rate control device which is independent of the mechanism utilized to open and close the feeding valves of machines of this type, whereby said control device is unaffected by play or lost motion between the component parts of said mechanism.

Still another object of my invention is the provision of a machine of the type set forth having a feed rate control at one extreme end and at the front of the machine where said control is of easy access and always in sight of the operator.

Another object of my invention is the provision of a machine for spreading fertilizer, seeds and the like, including a control arm pivotally mounted adjacent its inner end to the hopper for swinging movements between a generally vertical position wherein it is disposed close to and substantially parallel to the adjacent end of the hopper and another extreme position wherein it is directed inwardly of the end of the hopper and angularly disposed with respect to said generally vertical position, and of means limiting said movements of the arm between said positions whereby the arm is restrained against swinging movement in one direction beyond said vertical position.

A still further object of my invention is the provision of a novel method for producing a machine and feed rate control as set forth.

The above and still further highly important objects and advantages of my invention will become apparent from the following detailed specification, appended claims and attached drawings.

Referring to the drawings, which illustrate the invention, and in which like reference characters indicate like parts throughout the several views:

Fig. 3 is a view corresponding to Fig. 2 but showing a different position of some of the parts.

Fig. 4 is a fragmentary view corresponding to a portion of Figs. 2 and 3 but showing a still different position of some of the parts, on a still further enlarged scale;

Fig. 5 is an enlarged fragmentary detail in section taken substantially on the line 5—5 of Fig. 4; and Fig. 6 is a fragmentary transverse section taken substantially on the line 6—6 of Fig. 2.

Figure 1:
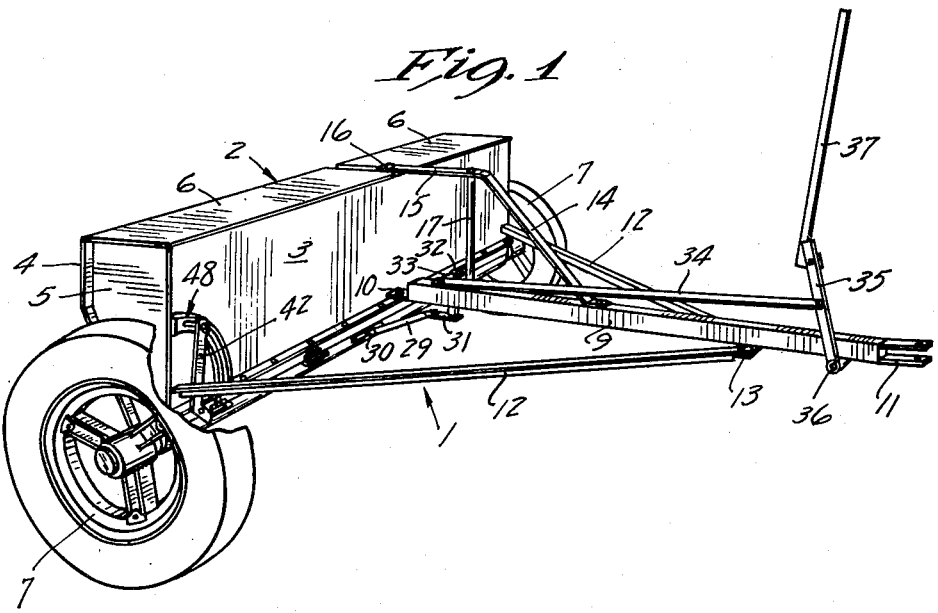
Fig. 1 is a view in perspective of a spreading machine incorporating my novel control device.

Referring with greater detail to the drawings, the numeral 1 indicates in its entirety a mobile spreading device for fertilizer, seeds and the like, which comprises an elongated hopper 2 having opposed front and rear walls 3 and 4, respectively, end walls 5, one of which is shown, and a pair of longitudinally spaced cover elements 6. A pair of pneumatic tire-equipped wheels 7 are journalled in bearings 8 at opposite ends of the hopper 2 for rotation on aligned axes. A tongue 9 is attached at its rear end to the hopper 2, as indicated at 10, and at its front end is provided with a bifurcated member 11 by means of which the tongue 9 may be secured to the drawbar of a tractor, not shown, whereby the machine may be pulled over a field to be treated. Diagonal brace members 12 are connected at their rear ends to opposite ends of the hopper 2, and at their front ends to the intermediate portion of the tongue 9, as indicated at 13. Other brace means includes a brace member 14 inclining rearwardly from the intermediate portion of the tongue 9 to the level of the top of the hopper 2 and from thence rearwardly, as indicated at 15, its rear end being bolted or otherwise secured to the top of the hopper between adjacent ends of the cover elements 6, as indicated at 16. A strut 17 extends vertically between the rear end portion of the tongue 9 and the front end of the brace portion 15 and anchored at its opposite ends to said tongue and rearwardly extended portion.

The hopper 2 is provided with a cross-sectionally arcuate bottom portion 18 within which is journalled for rotation an elongated agitator rotor 19. The rotor 19 may be assumed to be operatively coupled to one of the wheels 7 for common rotation therewith in the manner shown and described in my United States Letters Patent No. 2,350,107. The hopper bottom portion 18 is provided with a plurality of longitudinally spaced openings 20 for the discharge of seed or granular or powdered fertilizer and the like. An elongated cross-sectionally arcuate valve-acting gate plate 21 underlies and slidably engages the outer surface of the hopper bottom portion 18, and is provided with a plurality of longitudinally spaced openings 22, each of which is movable into and out of register with a cooperating one of the discharge openings 20 upon longitudinal sliding movements of the gate plate 21 in opposite directions with respect to the hopper bottom 18. The gate plate 21 is provided at its opposite side edges with longitudinally extending front and rear flanges 23 and 24, respectively, to the former of which is rigidly secured a plurality of inverted generally U-shaped loops 25. Upwardly opening hooks 26 secured to the front wall portion of the hopper 2 engage said loops 25 to permit longitudinal sliding movements of the gate plate 21 and swinging movement of the gate plate 21 toward and away from operative engagement with the outer surface of the bottom portion 18 of the hopper. A suitable latching device 27 is secured to the rear flange 24 of the gate plate 21 and is detachably secured to the cooperating hook-like elements 28, one of which is shown, projecting rearwardly outwardly from the rear wall 4 of the hopper 2. The latch 27 is of a type that permits longitudinal sliding movement of the gate plate 21 with respect to the hopper bottom, and in itself does not comprise the instant invention. Hence, for the sake of brevity, detailed showing and description thereof is deemed unnecessary.

Release of the latch 27 permits the guide plate 21 to be swung downwardly about the axis of the hooks 25 so that the engaging surfaces of the hopper bottom and gate plate may be cleaned when necessary.

Figure 2:
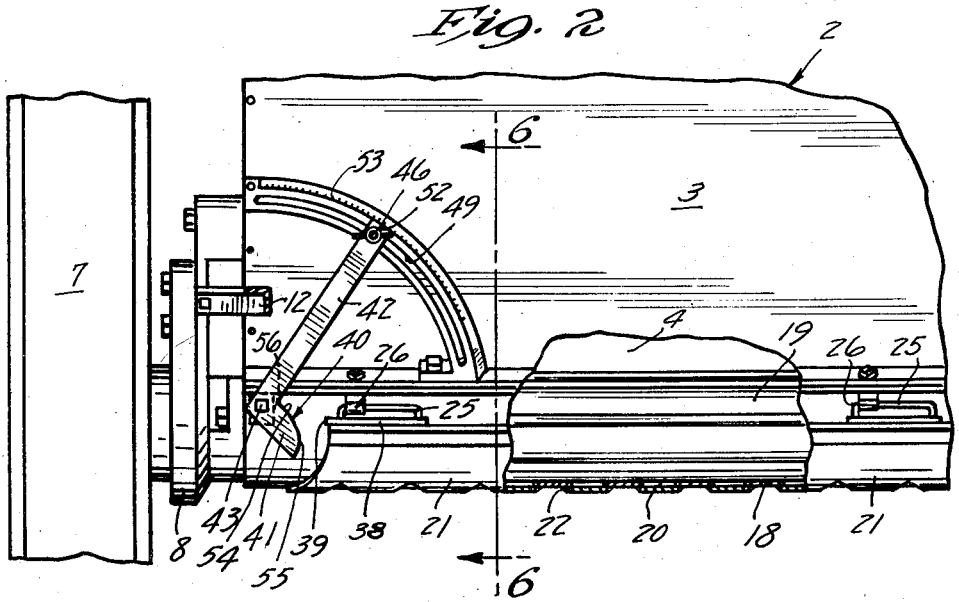
Fig. 2 is an enlarged fragmentary view in front elevation of the machine of Fig. 1, some parts being broken away and some parts shown in section.

It will be noted, particularly with reference to Fig. 2, that the openings 20 and 22 are so spaced in their respective members that when the gate plate 21 is moved to one extreme position of its sliding movement, the discharge openings 20 in the hopper bottom will be entirely closed by the portions of the gate plate 21 between the openings 22 therein. Means for moving the gate plate 21 between its extreme hopper closed position of Fig. 2 and the opposite extreme position, wherein the openings 22 are each in full registration with a different one of the openings 20 in the hopper bottom 18, includes a shifting link 29 pivotally secured at one end to the gate plate 21, as indicated at 30, a crank arm 31, the outer end of which is pivotally secured to the opposite end of link 29, a rock shaft 32 journalled to the rear end portion of the tongue 9, a second crank arm 33, a relatively long rigid link 34 and a lever 35. With reference to Fig. 1, it will be seen that the second crank arm 33 has its inner end secured to the opposite end of rock shaft 32 and its outer end pivotally secured to one end of the relatively long link 34. The lever 35 has its outer end pivotally secured to the front end portion of the tongue 9, as indicated at 36, the front end of link 34 being pivotally secured to the intermediate portion of the lever 35. The lever 35 is provided with an upwardly projecting extension element 37 which is located within easy reach of an operator riding the tractor, not shown. The crank arms 31 and 33 cooperate with the rock shaft 32 to form a bell crank by means of which forward and rearward movement of the link 34 causes movement of the link 29 in a direction transversely thereof or longitudinally with respect to the hopper 2. Thus, when the lever 35 and its extension element 37 are moved in a rearward direction, the gate plate 21 moves in a direction from the left toward the right with respect to Figs. 2 and 3 to shut off flow of material from the hopper. Obviously, forward movement of the lever 35 and its extension element 37 will cause the gate plate 21 to be moved in the opposite direction.

For the purpose of varying the degree to which the openings 22 in the gate plate 21 register with the discharge openings 20 in the hopper bottom 18, I provide novel control mechanism now to be described. A plate-like stop element 38 is welded or otherwise secured to the flange 23 of the gate plate 21 at an end thereof and has one end 39 engageable with a working face 40 of an abutment element 41 that is rigidly secured to and extends angularly outwardly from the inner end of a control arm 42. The control arm 42 is pivotally mounted on a pivot pin 43 which projects forwardly from a mounting block or lug 44 welded or otherwise rigidly secured to the front portion of the hopper bottom 18 at one extreme end portion thereof.

The outer end of the control arm 42 is provided with an opening 45 through which extends a locking screw 46 having a wing nut or the like 47 screw-threaded thereon. Bolted or otherwise rigidly secured to the front wall 3 of the hopper 2 is a sector element 48 that is provided with an arcuate slot 49. The locking screw 46 extends through the arcuate slot 49 and moves longitudinally thereof under swinging movements of the control arm 42 between a generally vertical position close to and substantially parallel with the extreme end of the hopper 2, and a generally horizontal position wherein it is directed inwardly of the end of the hopper 2. The sector element 48 is further formed to provide an inner surface 50 that is engaged by a head 51 on the locking screw 46 whereby, when the wing nut 47 is tightened on the screw 46, the control arm 42 will be frictionally locked in any desired set position with respect to the sector 48. The outer end of the control arm 42 is provided with an index mark 52 which cooperates with a graduated scale 53 on the sector element 48, whereby the extent of register of the cooperating openings 22 and 20 are indicated when the stop element 38 is in contact with the operating surface 40 of the abutment element 41. It is important to note that the operating face 40 of the abutment element 41 is formed to provide a relatively flat surface portion 54 adjacent its inner end and a curved surface portion 55 at its outer end portion, the surface portion 54 being tangential to one end of the curved surface portion 55. The curved surface portion 55 is preferably an irregular curve, substantially all portions of which are eccentric to the axis of the pivot pin 43. It is important to note that, when the control arm is moved to its extreme limit of movement wherein the same is in its generally horizontal position, the flat operating surface portion 54 is coplanar with the adjacent side 56 of the lug 44, for a purpose which will hereinafter become apparent. Mounted in the arcuate slot 49 of the sector element 48 is a wing nut-equipped stop screw 57 which, when the control arm 42 is placed in any given position and frictionally locked by means of its screw 46 and wing nut 47, is moved into side-by-side relationship with the control arm 42 and locked in place, whereby to further hold the control arm against movement which might be imparted thereto in the event that the operator moves the valve-acting gate plate 21 with undue force in the direction of engagement of the stop element 38 with the abutment element 41. With the above arrangement, when the control arm 42 is moved to a generally vertical position with the index mark 52 thereof in register with the zero mark of the indicia 53, the abutment element 41 is positioned so as to prevent movement of the gate plate 21 sufficiently to place the openings 22 thereof in register with the discharge openings 20, and no material will be dispensed from the hopper. As the control arm 42 is moved away from the zero point on the indicia and toward the larger numbers thereof, the gate plate 21 is permitted to be moved further toward full registration of the openings 22 with the discharge openings 20. Thus, the rate of flow or discharge of the material from the hopper 2 may be controlled with extreme accuracy. The abutment element 41 and control arm 42 are sufficiently rigid to permit repeated closing and reopening of the gate plate to the desired extent without variation of the effective size of the discharge apertures defined by the openings 20 and 22 when the gate plate is moved to its predetermined open position.

It will be noted that, when the control arm 42 is moved to its extreme generally horizontal position, movement of the gate plate 21 toward the abutment element 41 will cause the end 39 of the stop element 38 to simultaneously engage the flat operating face 54 of the stop element 41 and the adjacent side 56 of the lug 44. In order that the necessary accuracy be obtained in the building of my novel machine, I provide a novel method for producing the hopper bottom 18 and gate plate 21 as follows:

The hopper bottom and gate plate are initially formed to their cross-sectionally arcuate shape and their respective side flanges bent outwardly in suitable stamping machines. The lug 44 is then welded in place on the hopper bottom section 18 and the stop element 38 is welded or otherwise rigidly secured to the adjacent end of the flange 23 on the gate plate 21. The hopper bottom section 18 and gate plate 21 are then placed in nesting relationship with the outer end 39 of the stop element 38 in abutting engagement with the side 56 of the lug 44. While the gate plate 21 is held in such relationship with the hopper bottom section 18, the openings 20 and 22 are stamped or otherwise cut through the gate plate and hopper bottom together, after which the hopper bottom 18 and gate plate 21 are assembled to the side and end walls of the hopper 2 and the control arm 42 and sector 48 mounted thereon. The flat operating face 54 of the stop element 41, being in coplanar relationship with the side 56 of the lug 44 when the control arm 42 is moved to its extreme generally horizontal position, the openings 22 will obviously be in full registration with the discharge openings 20 when the gate plate is moved to its limit of movement in a gate open direction.

It will further be noted that both the gate plate moving link 29 and the stop and abutment elements 38 and 41 are disposed at the front or hinged side of the gate plate 21. With this arrangement, the thrust of the link 29 is in a relatively straight line toward the abutment element 41 and any bending or distortion of the material comprising the gate plate 21 is avoided in the event that the operator exerts undue force in moving the lever 35 in a direction to initiate feeding of the material to be dispensed. The stop and abutment elements 38 and 41, being at the extreme end portion of the hopper, the gate plate 21 may be readily unlatched and swung away from engagement with the hopper bottom section 18 for cleaning and the like without interference from the abutment element 41. Moreover, the control arm being at the extreme end of the hopper, the same may be easily reached by the operator for adjustment, and being prevented from swinging beyond its generally vertical position and outwardly of the end of the hopper, it is protected from injury and is not subject to entanglement with growing vegetation as the machine passes through a field.

My invention has been thoroughly tested and found to be completely satisfactory for the accomplishment of the objectives set forth; and, while I have shown and described a commercial embodiment of my novel machine, it will be understood that the same is capable of modification without departure from the spirit and scope of the invention as defined in the claims.

What I claim is:

1. In a device for spreading granular material, an elongated wheel-mounted mobile hopper having a plurality of longitudinally spaced discharge openings in its bottom portion, a valve-acting gate plate underlying said hopper bottom portion and having discharge openings registrable with the discharge openings of the hopper bottom to a variable extent under longitudinal sliding movements of the gate plate with respect to the hopper, means mounting and guiding said gate plate for longitudinal sliding movements with respect to the hopper bottom to variably open and close said discharge openings, said gate plate having a stop element at one end which is disposed in closely spaced relation to the adjacent end of the hopper when said gate plate is moved longitudinally to a position to close the hopper bottom discharge openings, a control arm pivotally mounted adjacent its inner end to the hopper at a point between the vertical plane of the end of said hopper and the vertical plane of the adjacent end of said stop element, means limiting pivotal movements of said control arm between a generally vertical position wherein it is disposed close to and substantially parallel to the adjacent end of the hopper and another extreme position where it is directed inwardly of the end of the hopper and angularly disposed with respect to said generally vertical position, means for locking the control arm in different angularly disposed positions, a graduated arcuate scale associated with the upper end portion of the control arm and having one end disposed adjacent the said end of the hopper and extending inwardly and downwardly therefrom, and a laterally inwardly offset abutment element carried by the control arm adjacent the pivot thereof and having an operating face portion facing and disposed in the field of longitudinal movement of said stop element and defining a curve generally eccentric to the axis of pivotal movement of the control arm, whereby to adjustably limit the outward sliding movements of the gate plate and the resultant discharge rate through the cooperating discharge openings of the hopper and gate plate under different positions of the control arm.

2. In a device for spreading granular material, an elongated wheel-mounted mobile hopper having a plurality of longitudinally spaced discharge openings in its bottom portion, a valve-acting gate plate underlying said hopper bottom portion and having discharge openings registrable with the discharge openings of the hopper bottom to a variable extent under longitudinal sliding movements of the gate plate with respect to the hopper, means mounting and guiding said gate plate for longitudinal sliding movements with respect to the hopper bottom to variably open and close said discharge openings and for pivotal swinging movements toward and from the hopper bottom about an axis adjacent one longitudinal edge of the gate plate and extending longitudinally of the hopper, means displaceably retaining said gate plate in its operative position against the bottom of the hopper, said gate plate having a stop element at one end which is disposed in closely spaced relation to the adjacent end of the hopper when said gate plate is moved longitudinally to a position to close the hopper bottom discharge openings, a control arm pivotally mounted adjacent its inner end to the hopper at a point between the vertical plane of the end of said hopper and the vertical plane of the adjacent end of said stop element, means limiting pivotal movements of said control arm between a generally vertical position wherein it is disposed close to and substantially parallel to the adjacent end of the hopper and another extreme position where it is directed inwardly of the end of the hopper and angularly disposed with respect to said generally vertical position, means for locking the control arm in different angularly disposed positions, a graduated arcuate scale associated with the upper end portion of the control arm and having one end disposed adjacent the said end of the hopper and extending inwardly and downwardly therefrom, and a laterally inwardly offset abutment element carried by the control arm adjacent the pivot thereof and having an operating face portion facing and disposed in the field of longitudinal movement of said stop element and defining a curve generally eccentric to the axis of pivotal movement of the control arm, whereby to adjustably limit the outward sliding movements of the gate plate and the resultant discharge rate through the cooperating discharge openings of the hopper and gate plate under different positions of the control arm.

3. In a device for spreading granular material, an elongated wheel-mounted mobile hopper having a plurality of longitudinally spaced discharge openings in its bottom, a gate plate underlying said hopper bottom and having discharge openings registrable with the discharge openings of said hopper bottom to a variable extent under longitudinal sliding movements of said gate plate with respect to said hopper bottom, means mounting and guiding said gate plate for longitudinal sliding movements with respect to said hopper bottom to variably open and close the discharge openings thereof and for pivotal swinging movements toward and away from said hopper bottom about an axis adjacent one longitudinal edge of said gate plate and extending longitudinally of said hopper, said means including cooperating hinge elements on said hopper and gate plate, means displaceably retaining said gate plate in its operative position against the bottom of the hopper, a stop element on said gate plate disposed in closely spaced relation to one end of the hopper when said gate plate is moved to a position to close the hopper bottom discharge openings, a control arm, means pivotally connecting said control arm at its lower end to the hopper at a point between the vertical plane at one end of the hopper and the vertical plane of the adjacent end of said stop element and adjacent a cooperating pair of said hinge elements, means limiting pivotal movement of said control arm between a generally vertical position where it is disposed close to and substantially parallel to the adjacent end of the hopper and another extreme position wherein it is directed inwardly of the end of the hopper and angularly disposed with respect to its generally vertical position, means for locking the control arm in different angularly disposed positions, a graduated arcuate scale associated with the upper end portion of the control arm and having one end disposed adjacent to said end of the hopper and extending inwardly and downwardly therefrom, and a laterally inwardly offset abutment element carried by the control arm adjacent the pivot thereof and having an operating face portion facing and disposed in the field of longitudinal movement of the gate plate stop element and defining a curve that is generally eccentric to the axis of pivotal movement of the control arm, whereby to adjustably limit outward sliding movements of the gate plate and the resultant discharge rate through the cooperating discharge openings of the hopper and gate plate under different positions of said control arm.

4. In a device for spreading granular material, an elongated wheel-mounted mobile hopper having a plurality of longitudinally spaced discharge openings in its bottom, a gate plate underlying said hopper bottom and having discharge openings registrable with the discharge openings of said hopper bottom to a variable extent under longitudinal sliding movements of said gate plate with respect to said hopper bottom, means mounting and guiding said gate plate for longitudinal sliding movements with respect to said hopper bottom to variably open and close the discharge openings thereof and for pivotal swinging movements toward and away from said hopper bottom about an axis adjacent one longitudinal edge of said gate plate and extending longitudinally of said hopper, said means including cooperating hinge elements on said hopper and gate plate, means displaceably retaining said gate plate in its operative position against the bottom of the hopper, a stop element on said gate plate disposed in closely spaced relation to one end of the hopper when said gate plate is moved to a position to close the hopper bottom discharge openings, a control arm, means pivotally connecting said control arm at its lower end to the hopper at a point between the vertical plane at one end of the hopper and the vertical plane of the adjacent end of said stop element and adjacent a cooperating pair of said hinge elements, a sector element mounted on said hopper and having its axis coincident with the pivot axis of said control arm, said sector element having one end disposed adjacent said one end of the hopper and extending inwardly and downwardly therefrom, said sector element defining an arcuate slot and having a graduated scale thereon concentric with said slot, a clamping element on said control arm extending through said slot and selectively engageable with opposite ends of said slot to positively limit movements of the control arm in opposite directions, said control arm at one extreme position of its pivotal movement being disposed in a generally vertical position close to and substantially parallel to the adjacent end of the hopper and in the other extreme position of its pivotal movement being directed inwardly of the end of the hopper and angularly disposed with respect to its generally vertical position, and a laterally inwardly offset abutment element carried by the control arm adjacent the pivot thereof and having an operating face portion facing and disposed in the field of longitudinal movement of the gate plate stop element and defining a curve that is generally eccentric to the axis of pivotal movement of the control arm, whereby to adjustably limit outward sliding movements of the gate plate and the resultant discharge rate through the cooperating discharge openings of the hopper and gate plate under different positions of said control arm.

5. The structure defined in claim 4 in which the said abutment element is provided with a flat operating face portion tangential to said curved face portion, and in which the means pivotally connecting said control arm to the hopper comprises a mounting lug secured to the hopper and a pivot pin extending outwardly therefrom and through the inner end of said control arm, one side of said mounting lug being coplanar with said flat face portion of the abutment element when the control arm is moved to its limit of movement toward an angularly disposed relationship with the vertical, whereby the stop element on said gate plate engages said flat faced portion and said one side of the mounting lug simultaneously.

6. A method of producing a device for distributing granular material, said method comprising, producing an elongated hopper having a cross-sectionally arcuate bottom, forming a strip of sheet metal into a cross-sectionally arcuate trough to provide a valve-acting gate plate, rigidly securing a lug to said hopper adjacent one end and the arcuate bottom thereof, mounting said gate plate in nesting engagement with the outer surface of said arcuate bottom portion of the hopper and into abutting engagement of its adjacent end with said lug on the hopper, and thereafter perforating said hopper bottom and gate plate together to provide a plurality of registering longitudinally spaced discharge apertures in said hopper bottom and the gate plate while the same are in said nested relationship, whereby, when said one end of the gate plate is in abutment with said lug, each of the discharge apertures in said gate plate will be in register with a different one of the discharge apertures in said hopper bottom.

7. A method of producing a device for distributing granular material, said method comprising, producing an elongated hopper having a cross-sectionally arcuate bottom, forming a strip of sheet metal into a cross-sectionally arcuate trough to provide a valve-acting gate plate, rigidly securing a lug to said hopper adjacent one end and the arcuate bottom thereof, mounting said gate plate in nesting engagement with the outer surface of said arcuate bottom portion of the hopper and into abutting engagement of its adjacent end with said lug on the hopper, perforating said hopper bottom and gate plate together to provide a plurality of registering longitudinally spaced discharge apertures in said hopper bottom and the gate plate while the same are in said nested relationship, mounting ground-engaging wheels to opposite ends of said hopper and a drawbar to the intermediate portion thereof, applying control linkage to said drawbar and said gate plate whereby said gate plate may be moved longitudinally toward and away from said lug, and mounting an abutment-equipped control arm on said lug for swinging movements to provide stop means adjustably limiting movement of said gate plate toward said lug.

References Cited in the file of this patent

UNITED STATES PATENTS 2,703,193   Seltzer _____ Mar. 1, 1955